No. 832,274. PATENTED OCT. 2, 1906.
G. W. PROBST.
COOKING UTENSIL.
APPLICATION FILED MAR. 13, 1906.
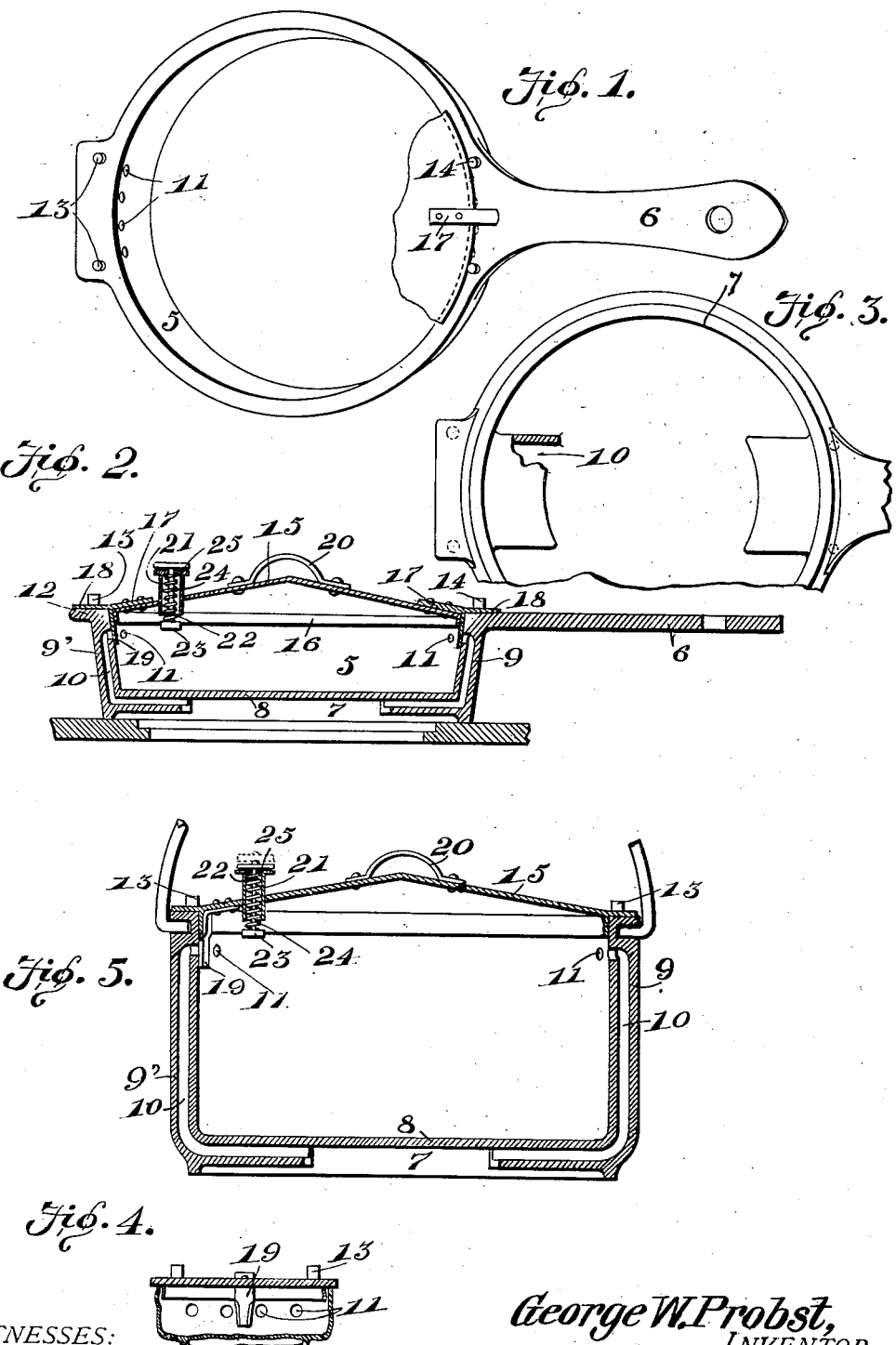
WITNESSES:
George W. Probst,
INVENTOR.
By C. A. Snow & Co.
ATTORNEYS

UNITED STATES PATENT OFFICE.

GEORGE WASHINGTON PROBST, OF LOCK HAVEN, PENNSYLVANIA.

COOKING UTENSIL.

No. 832,274. Specification of Letters Patent. Patented Oct. 2, 1906.

Application filed March 13, 1906. Serial No. 305,856.

*To all whom it may concern:*

Be it known that I, GEORGE WASHINGTON PROBST, a citizen of the United States, residing at Lock Haven, in the county of Clinton and State of Pennsylvania, have invented a new and useful Cooking Utensil, of which the following is a specification.

This invention relates to frying-pans, stew-pans, pots, and other culinary vessels, and has for its object to provide means for collecting and consuming the steam and other vapors arising from the food during the process of cooking.

A further object of the invention is to provide a cooking vessel having a plurality of fume or draft passages communicating with the interior of the vessel and extending beneath the bottom of the latter for conducting the vapors to the stove, and, further, to provide means for removing any deposits of grease or other foreign matter at the entrance to the draft-passages.

A further object is to form the cover of the vessel with a safety-valve for permitting the escape of steam or vapor in case the draft-passages become accidentally obstructed.

A still further object of the invention is to generally improve and simplify this class of devices, so as to add to their utility and durability, as well as to reduce the cost of manufacture.

In the accompanying drawings, forming a part of this specification, Figure 1 is a top plan view of a cooking utensil constructed in accordance with my invention, a portion of the cover being broken away to expose the interior of the vessel. Fig. 2 is a longitudinal sectional view of the same. Fig. 3 is a bottom plan view of a portion of a vessel. Fig. 4 is a detail sectional view of the cleaning device. Fig. 5 is a longitudinal sectional view illustrating a modified form of the invention.

Similar numerals of reference indicate corresponding parts in all of the figures of the drawings.

The improved fume-conducting means may be used in connection with frying-pans, stew-pans, domestic boilers, and other cooking utensils, and by way of illustration is shown applied to a frying-pan or skillet of the ordinary construction, in which 5 designates the body of the vessel, 6 the handle, and 7 the marginal flange depending below the bottom 8 of the vessel, as shown.

The side walls of the vessel are reinforced or thickened to form enlargements 9 and 9', which extend laterally beneath the bottom of the receptacle to points adjacent the center of the latter, and formed in said enlargements are draft or fume conducting passages 10, communicating with the interior of the vessel by means of spaced openings or apertures 11. The walls of the vessel at the top thereof are formed with a laterally-extending flange 12, and secured to said flange are spaced pins or lugs 13, there being similar lugs 14 secured to the upper face of the handle 6 near the adjacent or interior walls of the vessel. Mounted for limited rotation on the vessel is a substantially conical-shaped lid or cover 15, provided with a depending retaining-flange 16, and riveted or otherwise rigidly secured to the cover are brackets 17, the ends of which are extended to form laterally-projecting arms 18 for engagement with the stop-pins 13 and 14. Secured to or formed integral with the brackets 17 are depending scrapers or cutters 19, which engage the interior walls of the vessel at the openings 11 and serve to remove any deposits of grease or other foreign matter tending to obstruct said openings. It will thus be seen that by grasping the handle 20 and partially rotating the vessel-cover the knives or scrapers 19 will be moved laterally across the apertures 11, the extent of movement of the cover 15 being limited by engagement of the arm 18 with the stop-pins 13 and 14.

As a means for permitting the escape of steam or vapor should the apertures 11 become accidentally obstructed, there is provided a safety-valve consisting of a casing 21, extended through the cover and communicating with the interior of the receptacle. Disposed within the casing 21 is a rod 22, provided with a valve 23, a coiled spring 24 being interposed between the valve 23 and an annular shoulder 25, secured to the casing for normally holding the valve in closed position.

In operation the frying pan or vessel containing the food to be cooked is placed on the stove and positioned over the opening communicating with the fire-pot, so that the steam and other vapor arising during the process of cooking will pass through the apertures 11 and fume-passages 10 to the bottom of the vessel and be discharged through the openings in the top of the stove to the fire-box, and thus be effectually consumed.

Attention is called to the fact that by having the vessel formed with the depending marginal flanges 7 the discharge ends of the fume-passages are spaced from the top of the stove, while by having the lateral enlargements extended inwardly to points adjacent the center of the vessel the fumes and vapors are discharged downwardly at the center of the opening in the top of the stove, thus preventing the escape of any of the fumes and rendering the cooking process odorless.

In Fig. 5 of the drawings there is illustrated a modified form of the invention, showing the same applied to a stew pan or pot, the construction and relative disposition of the various parts being otherwise substantially the same as those shown in Figs. 1 and 3 of the drawings.

Having thus described the invention, what is claimed is—

1. A culinary vessel having a fume-conducting passage communicating with the interior of the vessel, a cover mounted for rotation on the vessel, a scraping-blade depending from the cover and movable across the mouth of the fume-passage, said scraping-blade being of less width than the width of the fume-passage, and means for limiting the rotary movement of the cover.

2. A culinary vessel having a fume-conducting passage communicating with the interior of the vessel, spaced lugs secured to the vessel, a cover mounted for rotation on said vessel, and provided with lateral arms adapted to engage the lugs for limiting the rotary movement of said cover, and a scraping-blade depending from the cover and movable across the mouth of the fume-passage said blade being of less width than the width of the fume-passage.

3. A culinary vessel having a fume-conducting passage communicating with the interior of the vessel, spaced lugs secured to the vessel, a cover mounted for rotary movement on said vessel, arms carried by the cover and adapted to engage the lugs for limiting the rotary movement of the cover, and a scraper movable across the mouth of the fume-passage.

4. A culinary vessel having a fume-conducting passage communicating with the interior of the vessel, spaced lugs secured to the vessel, a cover mounted for rotary movement on said vessel, a bracket secured to the cover and provided with a laterally-extended arm adapted to engage the lugs for limiting the rotary movement of the cover, and a scraper depending from the bracket and adapted to engage the walls of the vessel at the mouth of the fume-passage.

5. A culinary vessel provided with a depending flange and having its side walls reinforced and provided with oppositely-disposed fume-conducting passages communicating with the interior of the vessel and extended inwardly from said flange beneath the bottom of the vessel to points adjacent the center of the same, a cover mounted for limited rotation on the vessel, a safety-valve carried by the cover, and spaced scraping-blades depending from the cover and adapted to engage the interior walls of the vessel at said fume-passages.

6. A culinary vessel provided with oppositely-disposed enlargements the ends of which are extended laterally beneath the bottom of the vessel and provided with fume-conducting passages there being spaced openings formed in the interior walls of the vessel and communicating with said fume-passages, spaced lugs secured to the vessel a cover mounted for rotation on the vessel and provided with lateral arms adapted to engage the lugs for limiting the rotary movement of the cover, and a scraping-blade of less width than the fume-passages, and adapted to engage the interior walls of the vessel at said openings.

In testimony that I claim the foregoing as my own I have hereto affixed my signature in the presence of two witnesses.

GEORGE WASHINGTON PROBST.

Witnesses:
ISAAC RUMBERGER,
ALBERT E. SUITER.